United States Patent
Zou et al.

(10) Patent No.: US 10,473,209 B2
(45) Date of Patent: Nov. 12, 2019

(54) HEAT EXCHANGE DEVICE

(71) Applicant: Hangzhou Sanhua Research Institute Co., Ltd., Hangzhou, Zhejiang (CN)

(72) Inventors: Jiang Zou, Zhejiang (CN); Weixin Jiang, Zheijiang (CN); Haoming Qiu, Zhejiang (CN); Zhiyong Liao, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 174 days.

(21) Appl. No.: 15/220,995

(22) Filed: Jul. 27, 2016

(65) Prior Publication Data

US 2017/0030456 A1 Feb. 2, 2017

(30) Foreign Application Priority Data

Jul. 29, 2015 (CN) .......................... 2015 1 0454777
Jul. 29, 2015 (CN) .......................... 2015 1 0455315

(51) Int. Cl.
*F16H 57/04* (2010.01)
*F28F 27/02* (2006.01)
(Continued)

(52) U.S. Cl.
CPC ......... *F16H 57/0417* (2013.01); *F01M 5/002* (2013.01); *F01M 5/007* (2013.01);
(Continued)

(58) Field of Classification Search
CPC . F16H 57/0417; F16H 57/0413; F01M 5/007; F16K 11/065; F16K 31/002;
(Continued)

(56) References Cited

U.S. PATENT DOCUMENTS 5,165,468 A * 11/1992 Tajima .................. B60K 11/04
165/167
5,307,869 A * 5/1994 Blomgren ............... F28D 9/005
165/153
(Continued)

FOREIGN PATENT DOCUMENTS

| DE | 102012000326 A1 | 7/2013 |
|---|---|---|
| DE | 102014118313 A1 | 12/2015 |
| EP | 2428759 A2 | 3/2012 |

OTHER PUBLICATIONS

Extended European Search Report for Application No. EP 16181526.1 dated Mar. 31, 2017.
(Continued)

*Primary Examiner* — Ljiljana V. Ciric
(74) *Attorney, Agent, or Firm* — Wolf, Greenfield & Sacks, P.C.

(57) ABSTRACT

A heat exchange device includes a heat exchanger, a mounting plate, and a connecting block. The heat exchanger includes several first plates, several second plates, and an end plate and a bottom plate located at two sides of the heat exchanger. Each of the first plates and an adjacent second plate form a first flow passage and a second flow passage, the mounting plate and the end plate are fixedly mounted, and the connecting block is fixedly mounted to the bottom plate. A passage running through the heat exchanger and not in communication with the first flow passage and the second flow passage is formed in the heat exchanger, the passage has one end in communication with a communicating hole of the mounting plate, and another end in communication with a connecting channel of the connecting block.

19 Claims, 7 Drawing Sheets

(51) Int. Cl.
*F28D 9/00* (2006.01)
*F16K 11/065* (2006.01)
*F16K 31/00* (2006.01)
*F28F 9/007* (2006.01)
*F28F 13/12* (2006.01)
*F01M 5/00* (2006.01)
*F28D 21/00* (2006.01)

(52) U.S. Cl.
CPC ........ *F16H 57/0413* (2013.01); *F16K 11/065* (2013.01); *F16K 31/002* (2013.01); *F28D 9/005* (2013.01); *F28F 9/0075* (2013.01); *F28F 13/12* (2013.01); *F28F 27/02* (2013.01); *F28D 2021/0049* (2013.01); *F28D 2021/0089* (2013.01); *F28F 2250/06* (2013.01)

(58) Field of Classification Search
CPC .......... F28F 13/12; F28F 9/0075; F28F 27/02; F28F 2250/06; F28D 9/005; F28D 2021/0049; F28D 2021/0089
See application file for complete search history.

(56) References Cited

U.S. PATENT DOCUMENTS

| | | | | |
|---|---|---|---|---|
| 5,464,056 A | * | 11/1995 | Tajima | F28D 9/0012 123/196 AB |
| 5,492,171 A | * | 2/1996 | Kallrot | F28D 9/005 165/144 |
| 5,823,247 A | * | 10/1998 | Weibler | F28D 9/0037 165/76 |
| 5,964,280 A | * | 10/1999 | Wehrmann | F28D 9/005 165/140 |
| 5,964,283 A | * | 10/1999 | Pavlin | F28D 9/005 165/167 |
| 9,234,604 B2 | * | 1/2016 | Kim | F28F 27/02 |
| 9,726,382 B2 | * | 8/2017 | Jensen | F24D 3/10 |
| 2004/0112579 A1 | * | 6/2004 | Strahle | F28D 9/005 165/166 |
| 2005/0155749 A1 | * | 7/2005 | Memory | F28D 9/005 165/167 |
| 2005/0194123 A1 | * | 9/2005 | Strahle | F28D 9/0012 165/167 |
| 2009/0101312 A1 | | 4/2009 | Gooden et al. | |
| 2011/0005741 A1 | | 1/2011 | Sheppard | |
| 2012/0234523 A1 | * | 9/2012 | Jouanny | F28D 9/005 165/166 |
| 2012/0247582 A1 | | 10/2012 | Lamb et al. | |
| 2013/0061584 A1 | * | 3/2013 | Gerges | F01N 5/02 60/320 |
| 2013/0087304 A1 | | 4/2013 | Ahmed et al. | |
| 2013/0126149 A1 | * | 5/2013 | Kim | F01P 3/18 165/297 |
| 2014/0352934 A1 | * | 12/2014 | Barone | B23P 15/26 165/166 |
| 2015/0168075 A1 | * | 6/2015 | Bertilsson | B21J 5/066 165/166 |
| 2015/0211810 A1 | * | 7/2015 | Meguriya | F28F 3/08 165/166 |
| 2015/0369115 A1 | | 12/2015 | Kim et al. | |
| 2016/0010929 A1 | * | 1/2016 | Takahashi | F28F 3/027 165/166 |

OTHER PUBLICATIONS

Partial European Search Report for Application No. EP 16181526.1, dated Nov. 23, 2016.

* cited by examiner

HEAT EXCHANGE DEVICE

CROSS-REFERENCE TO RELATED APPLICATIONS

The present application claims the benefit of priorities to Chinese patent application No. 201510455315. X titled "HEAT EXCHANGE DEVICE", filed with the Chinese State Intellectual Property Office on Jul. 29, 2015, and Chinese patent application No.201510454777. X titled "HEAT EXCHANGE DEVICE", filed with the Chinese State Intellectual Property Office on Jul. 29, 2015, the entire disclosures of which are incorporated herein by reference.

FIELD

The present application relates to the field of heat exchange technology, and particularly to a heat exchange integrated assembly.

BACKGROUND

A plate heat exchanger is defined as a heat exchanger in which a heat transfer element is a plate. Compared with a conventional heat exchanger, the plate heat exchanger has a compact structure, and is made from an aluminum alloy material, which is very light. Also, since the high thermal conductivity of the plate, the plate heat exchanger has high efficiency. Therefore, the plate heat exchanger has a high adaptive ability, which may be used in heat exchange between various fluids and phase change heat exchange in which aggregate state change occurs, and may be adapted to different heat exchange conditions such as countercurrent flow, cross-flow, multi-stream flow and multi-pass flow by arrangement and combination of flow passages, and can meet heat exchange requirements of a large-scale equipment by series connection, parallel connection or combination of series connection and parallel connection between units.

Currently, the plate heat exchanger is widely used in vehicles. One of applications of the plate heat exchanger is used for heat exchanging between cooling oil of a gearbox and coolant of an engine, i.e., the plate heat exchanger is used as an oil cooler, and the cooling oil of the gearbox passes the oil cooler or not under control of a thermostatic valve, in this way, the cooling oil of the gearbox is cooled. The thermostatic valve is in communication with the gearbox and the oil cooler respectively via pipelines.

With increasingly high requirements imposed on the performance of the vehicle, the temperature control requirement to the cooling oil of the gearbox is also accordingly high. Not only the cooling oil of the gearbox needs to be cooled during traveling of an vehicle, but also the cooling oil of the gearbox needs to be heated when the vehicle is just started, and particularly when the vehicle is started in a low temperature environment, so as to maintain the cooling oil of the gearbox in at an appropriate working temperature. Furthermore, with an increasing travel of the vehicle, cooling water of an engine may fail to decrease the temperature of the cooling oil of the gearbox.

Further, a mounting space in the vehicle is limited, and an increasing of parts and components may increase the difficulty of mounting.

Therefore, a technical issue to be addressed presently is to provide a heat exchange device which needs a reduced mounting space, and facilitates the temperature regulation of cooling oil of the gearbox.

SUMMARY

For addressing the above technical issues in the conventional technology, a heat exchange device is provided according to the present application, which can effectively address the above technical issues.

The heat exchange device according to the present application, which includes a heat exchanger, and a mounting plate and a connecting block located at two sides of the heat exchanger. The mounting plate and the connecting block are located at the two sides, opposite to each other, of the heat exchanger. The heat exchanger includes several first plates, several second plates, and an end plate and a bottom plate located at the two sides of the heat exchanger. Each of the first plates and an adjacent second plate form a first flow passage or a second flow passage, the first flow passage and the second flow passage are isolated from each other. The heat exchanger includes a heat exchange core. The heat exchange core includes the bottom plate, the end plate, the first plates and the second plates which are fixedly mounted. The mounting plate and the end plate are fixedly mounted. The connecting block and the bottom plate are fixedly mounted. The mounting plate includes at least one communicating hole. The connecting block includes a first connecting channel and a second connecting channel. The first connecting channel is in communication with the first flow passage.

The heat exchange device further includes a connecting passage running through the heat exchanger, the connecting passage is in communication with the communicating hole and the second connecting channel, and the connecting passage is not in communication with the second flow passage.

DETAILED DESCRIPTION

Embodiments of the present application are described with reference to the drawings.

Figure 1:
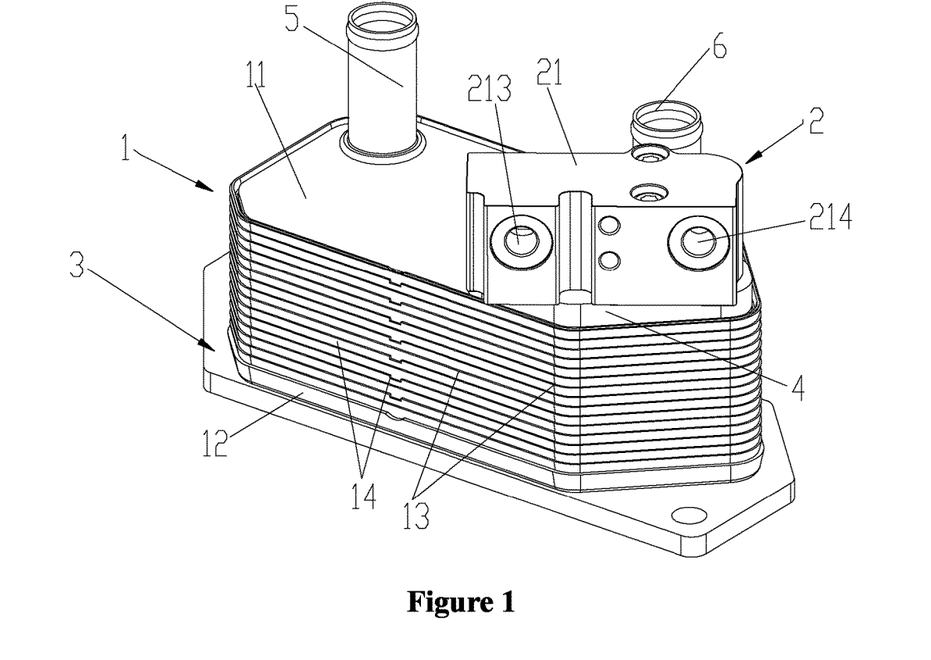
FIG. 1 is a schematic perspective view of an embodiment of a heat exchange device according to the present application.
Figure 2:
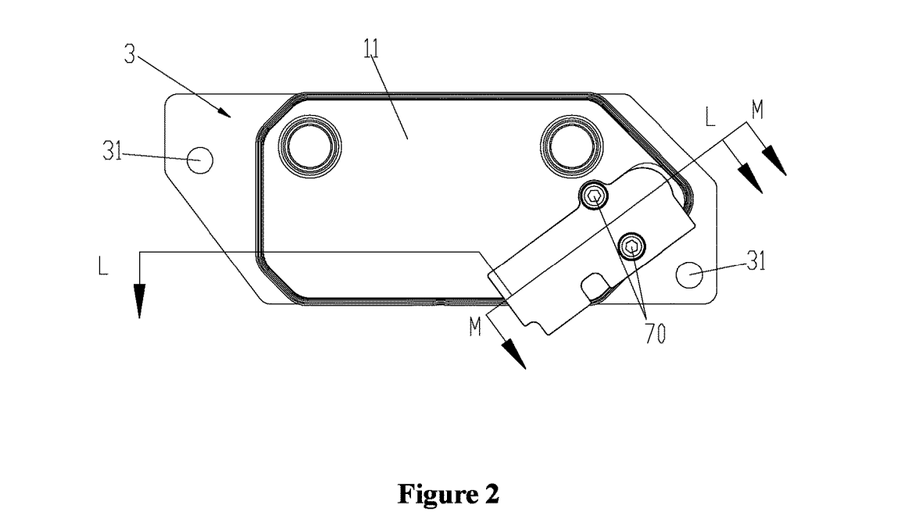
FIG. 2 is a schematic top view of the heat exchange device in FIG. 1.

FIG. 1 is a schematic perspective view showing the structure of an embodiment of a heat exchange device according to the present application. As shown in FIG. 1, in this embodiment, the heat exchange device includes a heat exchanger 1, a thermostatic valve component 2, a mounting plate 3 for fixedly mounting the heat exchange device, and a connecting block 4 for fixedly mounting the thermostatic valve component 2. The heat exchanger 1 and the mounting plate 3 may be fixedly mounted to each other by welding, and the connecting block 4 and the heat exchanger 1 may also be fixedly mounted to each other by welding. The mounting plate 3 and the connecting block 4 are respectively located at two sides of the heat exchanger 1.

The heat exchanger 1 includes several first plates 13 and several second plates 14 which are sequentially alternately arranged in a stacking manner, and an end plate 12 and a bottom plate 11 respectively located at two sides of the heat exchanger 1. Each of the first plates 13 and an adjacent second plate 14 form therebetween a first flow passage 101 or a second flow passage 102. The first flow passage 101 and the second flow passage 102 are arranged alternatively. For example, a front surface of a first plate and a second plate adjacent to the front surface of the first plate form therebetween a first flow passage 101. A back surface of the first plate and a second plate adjacent to the back surface of the first plate form therebetween a second flow passage 102. The first flow passage 101 and the second flow passage 102 are not in communication with each other. The mounting plate 3 and the end plate 12 may be fixed to each other by welding, and the connecting block 4 and the bottom plate 11 may be fixed to each other by welding.

Figure 6:
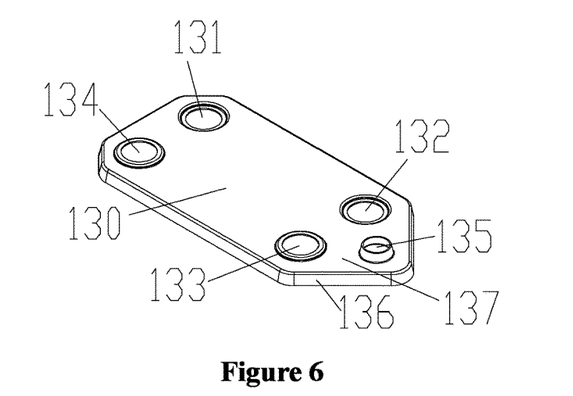
FIG. 6 is a schematic view showing the structure of a first plate of the heat exchange device in FIG. 1.
Figure 7:
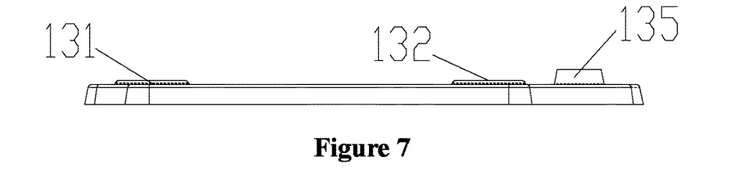
FIG. 7 is schematic front view of the first plate in FIG. 6.

As shown in FIGS. 6 and 7, the first plate 13 includes a plate plane and a flanging 136 located at an outer circumferential side of the plate plane. The flanging 136 protrudes from a back surface of the plate plane by a certain distance, and encircles the back surface of the plate plane. The plate plane includes a first plate plane 130 substantially in a rectangular shape and a second plate plane 137 adjacent to the first plate plane. Four port regions are respectively provided at four corners of the first plate plane 130: a first port region 131, a second port region 132, a third port region 133 and a fourth port region 134. A fifth port region 135 is provided on the second plate pane 137. The first port region 131, the second port region 132, the third port region 133 and the fourth port region 134 are each a circular step structure protruding from or depressed into the first plate plane 130 by a certain distance. A through hole for fluid flowing through is provided in each of the first port region 131, the second port region 132, the third port region 133 and the fourth port region 134. Further, two circular step structures of the first port region 131, the second port region 132, the third port region 133 and the fourth port region 134 protrude from the first plate plane 130 by a same distance, and the other two circular step structures of the first port region 131, the second port region 132, the third port region 133 and the fourth port region 134 are depressed into the first plate plane 130 also by a same distance. Apparently, it may also be that two circular step structures of the first port region 131, the second port region 132, the third port region 133 and the fourth port region 134 protrude from the first plate plane 130 by a certain distance and the other two of the first port region 131, the second port region 132, the third port region 133 and the fourth port region 134 are flush with the first plate plane 130, which may depend on practical requirements. For ease of description of the embodiments, an example, in which the first port region 131 and the second port region 132 protrude from the first plate plane 130 by a certain distance and the third port region 133 and the fourth port region 134 are depressed into the first plate plane 130 by a certain distance, is described, which does not limit the present application.

The fifth port region 135 is a hole flanging structure protruding from or depressed into the second plate plane 137 by a certain distance. The sum of the distance by which the first port region 131 protrudes from the first plate plane 130 and the distance by which the third port region 133 is depressed into the first plate plane 130 is smaller than or equal to the distance by which the fifth port region 135 protrudes from or is depressed into the second plate plane 137.

It should be noted here that, the fifth port region 135 may also be arranged on the first plate plane. For example, the fifth port region 135 is arranged at a position between the first port region and the second port region of the first plate plane 130. Specifically, the position of the fifth port region 135 may be arranged according to positions of the thermostatic valve component 2, a first connecting pipe 5 and a second connecting pipe 6. The second plate plane may not be provided in such an arrangement, thus, the volume of the heat exchanger is relatively small. In this embodiment, the fifth port region 135 is arranged on the second plate plane, which can reduce an interference between the region where the fifth port region is arranged and the heat exchange region of the heat exchanger, and prevent the heat exchange performance of the heat exchanger from being degraded.

It should be noted that, the two position arranging manners of the fifth port region 135 may depend on practical mounting requirements.

The structure of the second plate 14 is substantially the same with the structure of the first plate 13. The difference lies in that the directions in which the first port region, the second port region, the third port region, and the fourth port region protrude from or are depressed into the first plate plane in the second plate 14 are opposite to the directions in which the first port region, the second port region, the third port region and the fourth port region protrude from or are depressed into the first plate plane in the first plate 13. That is, the first plate plane of the first plate 13 is turned by 180 degrees with respect to the first plate plane of the second plate 14. Other structures of the second plate 14 are the same with or approximate to the structure of the first plate 13, which are not described here any more.

Figure 8:
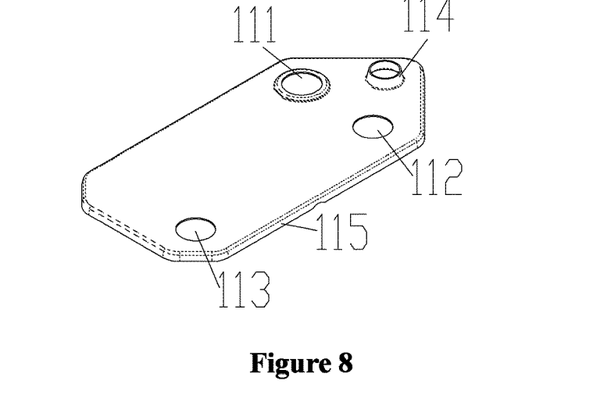
FIG. 8 is a schematic view showing the structure of a bottom plate of the heat exchange device in FIG. 1.

The bottom plate 11 also includes a plate plane and a flanging 115 encircling a back surface of the plate plane. A first port region 111, a second port region 112, a third port region 113 and a fourth port region 114 respectively corresponding to the second port region, the third port region, the fourth port region and the fifth port region of the first plate 13 or the second plate 14 are provided on the plate plane of the bottom plate 11, and the fourth port region 114 may also be a hole flanging structure. The second port region 112 and the third port region 113 are respectively in communication with the first connecting pipe 5 and the second connecting pipe 6.

Figure 9:
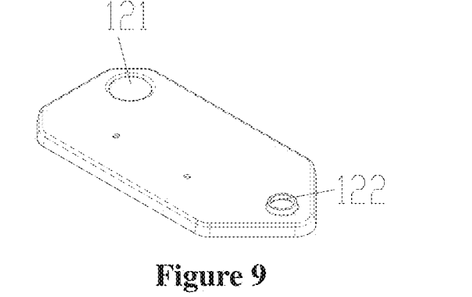
FIG. 9 is a schematic view showing the structure of an end plate of the heat exchange device in FIG. 1.

The end plate 12 also includes a plate plane and a flanging encircling a back surface of the plate plane. A first port region 121 and a second port region 122 respectively corresponding to the first port region and the fifth port region of the first plate 13 or the second plate 14 are provided on the plate plane. A second port region 122 is also a hole flanging structure. It should be noted here that, the third port region corresponding to the second port region of the first plate 13 or the second plate 14 may also be provided on the end plate.

Further, for increasing turbulence performance to the fluid in the first flow passage 101 and the second flow passage 102, fins may be provided between the first plate 13 and the second plate 14, or a concave-convex structure protruding from the plate plane by a certain height may be provided on the first plate 13 and the second plate 14. The concavo-convex structure may be a herringbone corrugation, and may also be a dimpled structure.

As shown in the drawings, the bottom plate 11, the end plate 12, the first plates 13 and the second plates 14 are mounted cooperatively to form a heat exchange core. The first port region of the first plate 13, the first port region of the second plate 14, the first port region of the end plate 12 are stacked to form a first passage 201. The second port region of the first plate 13, the second port region of the second plate 14 and the first port region of the bottom plate 11 are stacked to form a second passage 202. The third port region of the first plate 13, the third port region of the second plate 14, and the second port region of the bottom plate 11 are stacked to form a third passage 203. The fourth port region of the first plate 13, the fourth port region of the second plate 14, the third port region of the bottom plate 11 are stacked to form a fourth passage 204. The fifth port region of the first plate 13, the fifth port region of the second plate 14, the fourth port region of the bottom plate 11, and the second port region of the end plate 12 are stacked to form a fifth passage. A region enclosed by the first passage 201, the second passage 202, the third passage 203 and the fourth passage 204 is a main heat exchange region of the heat exchange core.

The first passage 201 and the second passage 202 are in communication with each other via the first flow passage 101, and the third passage 203 and the fourth passage 204 are in communication with each other via the second flow passage 102. The fifth passage is not in communication with the first flow passage 101 and the second flow passage 102, and the fifth passage runs through the heat exchanger 1. Apparently, in other embodiments, it may also be that the first passage 201 and the third passage 203 are in communication with each other, the second passage 202 and the fourth passage 204 are in communication with each other, or in other combination forms, and the relationship between the passages and the flow passages may depend on practical requirements and the structure of the plates, which is not limited here.

The heat exchanger further includes a first external connecting pipe 6 in communication with the third passage 203, a second external connecting pipe 5 in communication with the fourth passage 204. The first external connecting pipe 6 and the second external connecting pipe 5 may be fixed to the bottom plate 11 by means such as welding.

Figure 10:
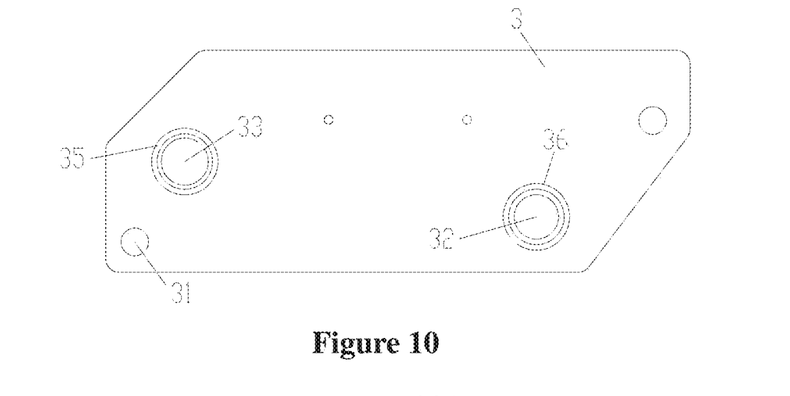
FIG. 10 is a schematic view showing the structure of a mounting plate of the heat exchange device in FIG. 1.
Figure 11:
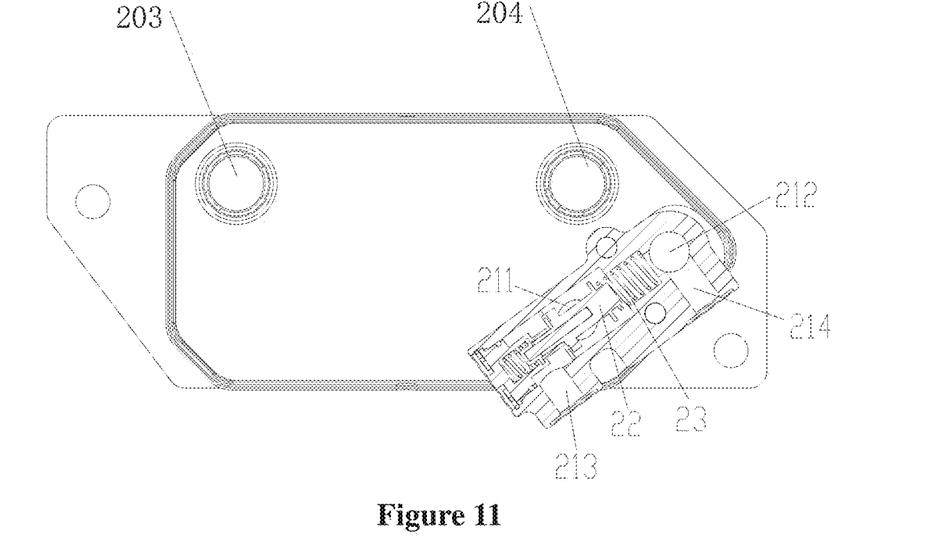
FIG. 11 is a schematic partially sectional view of the heat exchange device in FIG. 1.

As illustrated in the Drawings, the mounting plate 3 may be processed and formed from sheet metal by procedures such as stamping, machining, etc., and the sheet metal may be made of an aluminum alloy material. The mounting plate 3 includes a first communicating hole 32, a second communicating hole 33, and several mounting holes 31 located at an outer side. The first communicating hole 32 corresponds to the first port region of the end plate 12, and the second communicating hole 33 corresponds to the second port region of the end plate 12.

In an axis direction of the mounting holes 31, the mounting holes 31 are completely exposed outside the heat exchanger 1, i.e., the mounting holes 31 do not interfere with the heat exchanger. Arranged as such, when screws are used (not illustrated) to pass through the mounting holes 31 respectively to mount the heat exchange device, the screws will not contact the heat exchanger 1. This design, in one aspect, reduces the cost and mounting difficulty of the heat exchange device, and in another aspect, also reduces the rate of damage to the heat exchanger 1 in mounting process.

One surface of the mounting plate 3 may be fixedly mounted to the end plate 12 by welding or other ways. On another surface of the mounting plate, an outer circumferential side of an end of the first communicating hole 32 is provided with a first annular groove 36, and an outer circumferential side of an end of the second communicating hole 33 is provided with a second annular groove 35. A first sealing ring 34 may be mounted in each of the first annular groove 36 and the second annular groove 35. In this way, the mounting plate 3 may be directly fixedly mounted to a gearbox by screwing or other ways, and is sealed by the first sealing rings 34, and the mounting is simple and the occupied space is small.

It should be noted here, the shape and structure of the mounting plate 3 and the specific position and number of the mounting holes 31 may depend on the specific mounting position of the heat exchange device.

Figure 3:
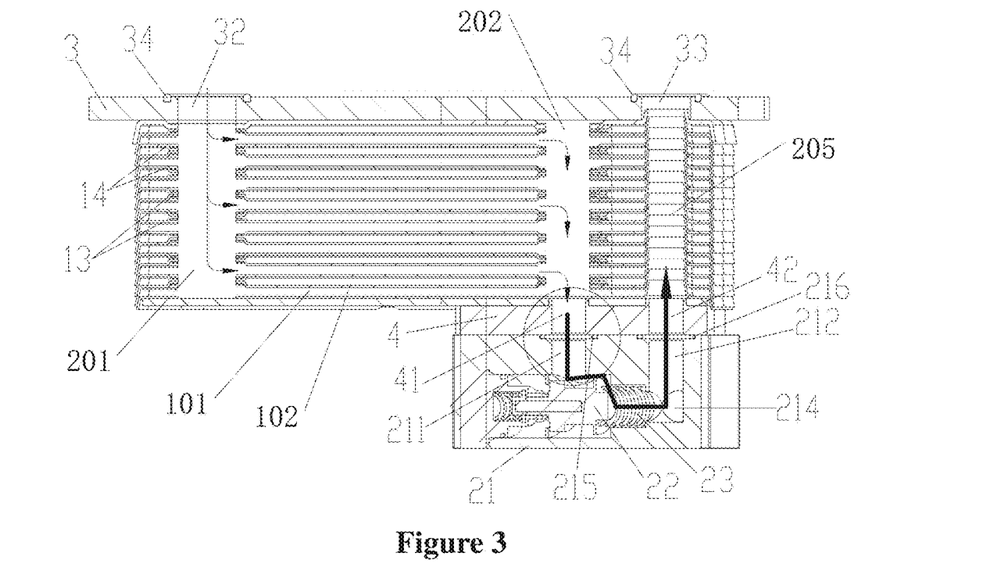
FIG. 3 is a schematic sectional view of FIG. 2 taken along L-L.
Figure 4:
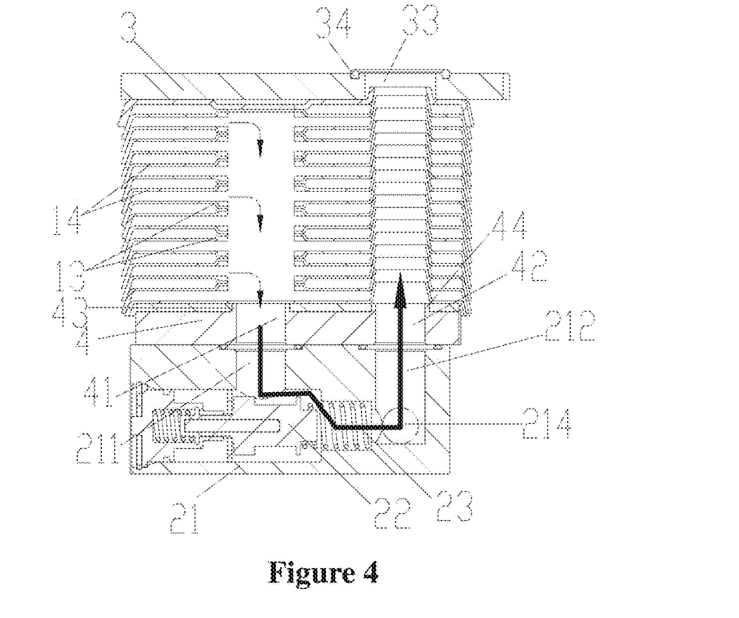
FIG. 4 is a schematic sectional view of FIG. 2 taken along M-M.
Figure 5:
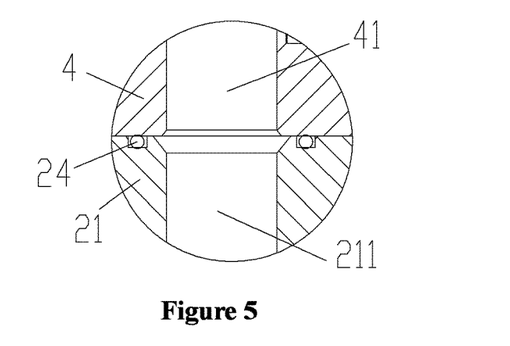
FIG. 5 is a schematic partially enlarged view of FIG. 3.

As shown in FIGS. 3 and 4, the connecting block 4 may be processed and formed from sheet metal by procedures such as stamping, machining, etc. . The connecting block 4 includes a first connecting channel 41 and a second connecting channel 42, and the first connecting channel 41 and the second connecting channel 42 run through the connecting block 4. One end of the first connecting channel 41 protrudes from an end surface of the connecting block 4 by a certain distance, and the connecting block 4 is formed thereon with a first outward extending portion 43. One end of the second connecting channel 42 also protrudes from the end surface of the connecting block 4 by a certain distance, and the connecting block 4 is formed thereon with a second outward extending portion 44.

The connecting block 4 may be fixed onto the bottom plate 11 by welding or other ways. The first connecting channel 41 corresponds to the first port region of the bottom plate 11, and the second connecting channel 42 corresponds to the fourth port region of the bottom plate 11. The first outward extending portion 43 extends into the second passage 202, and the second outward extending portion 44 extends into the fifth passage 205. The connecting block 4 may be portioned and mounted by the first outward extending portion 43 and the second outward extending portion 44.

As illustrated in the Drawings, the thermostatic valve component 2 includes a valve body 21, a thermally-actuated element 22 and a return spring 23. A thermo-sensitive element, which expands when subjected to heat, may be provided in the thermally-actuated element 22. The valve body 21 includes a cavity which has one end open, a first inlet passage 211, a first outlet passage 212, a second outlet passage 213 and a second inlet passage 214. The thermally-actuated element 22 and the return spring 23 are mounted in the cavity, and one end of the thermally-actuated element 22 is supported on the return spring 23.

Also, under the action of the thermally-actuated element 22 and the return spring 23, the first inlet passage 211 may be selectively in communication with the second outlet passage 213 or the first outlet passage 212, or, may be in communication with the first outlet passage 212 and the second outlet passage 213 simultaneously. When the temperature of the cooling oil flowing into the thermostatic valve component 2 from the first inlet passage 211 is overly high or higher than a first set temperature, the thermo-sensitive element in the thermally-actuated element 22 expands for being subjected to heat and allows the thermally-actuated element to compress the return spring 23, which prevents the first inlet passage 211 from being in communication with the first outlet passage 212, and allows the first inlet passage 211 to be in communication with the second outlet passage 213. When the temperature of the cooling oil flowing from the first inlet passage 211 into the thermostatic valve component 2 does not reach a second set temperature, the thermally-actuated element 22 allows the first inlet passage 211 to be in communication with the first outlet passage 212 at this time under the action of an elastic force of the return spring 23. While when the temperature of the cooling oil of the thermostatic valve component 2 is between the first set temperature and the second set temperature, the first inlet passage 211 may be in communication with the first outlet passage 212 and the second outlet passage 213 simultaneously, however, the flow rate of each outlet passage varies with the temperature.

When the first inlet passage 211 is in communication with the first outlet passage 212, the first inlet passage 211 may be in communication with the second outlet passage 213, and may also be not in communication with the second outlet passage 213. Further, when the first inlet passage 211 is in communication with the first outlet passage 212, the first inlet passage 211 may not be in communication with the second outlet passage 213, which arrangement can reduce internal leakage.

In this embodiment, an inlet of the first inlet passage 211 and an outlet of the first outlet passage 212 are located in the same side wall of the valve body 21, and an outlet of the second outlet passage 213 and an inlet of the second inlet passage 214 are also located in the same side wall of the valve body 21. The first inlet passage 211 is substantially in parallel with the first outlet passage 212. Such an arranging manner facilitates the mounting of the thermostatic valve component and the heat exchange device, and may also allow two external connecting pipes to be in communication with the second outlet passage 213 and the second inlet passage 214 respectively through only one pressing block. The cost is low, and the mounting is simple, and the occupied space is small. In addition, the outlet of the second outlet passage 213 and the inlet of the second inlet passage 214 may also be located in opposite side walls of the valve body 21. The two side walls are in parallel with each other, and are respectively adjacent to the side wall where the first inlet passage 211 is located.

The thermostatic valve component 2 and the connecting block 4 may be fixedly mounted by a screw 70. The first inlet passage 211 and the first outlet passage 212 are respectively in communication with the first connecting channel 41 and the second connecting channel 42 of the connecting block 4. Further, the distance between a center line of the first inlet passage 211 and a center line of the first outlet passage 212 is substantially the same with the distance between a center line of the first connecting channel 41 and a center line of the second connecting channel 42. The first passage 201, the first connecting channel 41 and the first inlet passage 211 substantially have the same center line, and the second passage 202, the second connecting channel 42 and the second inlet passage 212 substantially have the same center line. In addition, the thermostatic valve component and the connecting block may also be welded and fixed by welding.

As illustrated in the Drawings, an outer circumferential side of the inlet of the first inlet passage 211 is provided with a third annular groove 215, and a second sealing ring 24 is provided in the third annular groove 215. An outer circumferential side of the outlet of the second outlet passage 213 is provided with a fourth annular groove 216, and a second sealing ring 24 is provided in the fourth annular groove 216. When the thermostatic valve component 2 and the connecting block 4 are fixedly mounted by the screw 70, the second sealing ring 24 is pressed, thus achieving sealing and preventing external leakage.

It should be noted here that, the third annular groove and the fourth annular groove may also be located on the connecting block 4.

Figure 16:
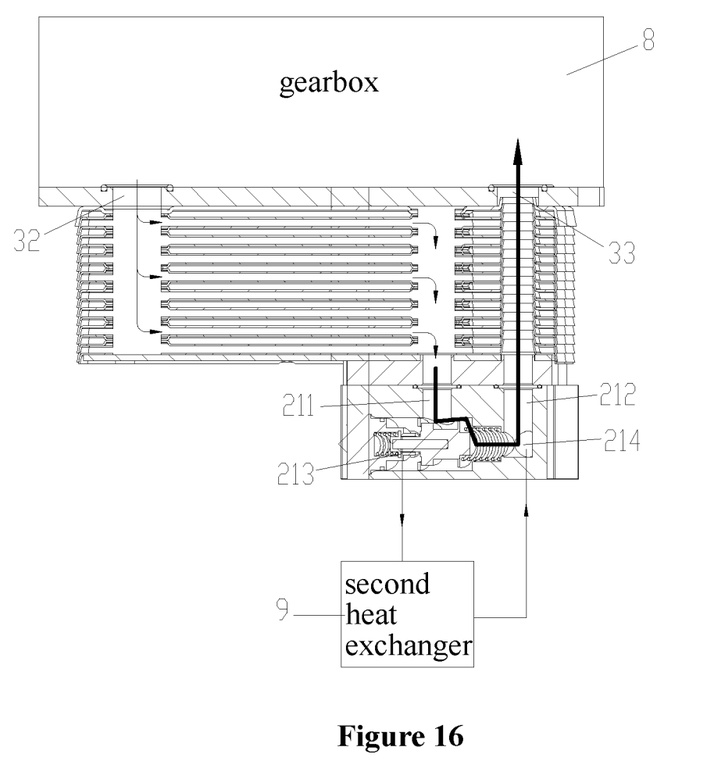
FIG. 16 is a schematic view showing an embodiment of a cooling system for cooling oil of a gearbox according to the present application.

FIG. 16 shows a cooling system for cooling oil of the gearbox having the heat exchange device according to this embodiment. The cooling system for the cooling oil of the gearbox includes a gearbox 8, the heat exchange device, a second heat exchanger 9 and a third heat exchanger. The gearbox 8 has two connecting ports, and the two connecting ports are respectively in communication with the first communicating hole 32 and the second communicating hole 33 of the mounting plate 3 of the heat exchange device. The gearbox 8 and the mounting plate 3 are fixedly mounted by screwing or other ways. The first sealing ring 34 is pressed, thus achieving sealing and preventing external leakage, and a connecting pipe between a heat exchanger and a gearbox in the conventional technology is dispensed. The second heat exchanger 9 is in communication with the second outlet passage 213 and the second inlet passage 214 of the thermostatic valve component 2 of the heat exchange device via pipelines. The cooling system for the cooling oil of the gearbox further includes a third heat exchanger (not illustrated) in communication with the first connecting pipe 5 and the second connecting pipe 6.

The third heat exchanger may be a cooling water tank of an engine, and cooling water may flow to the second flow passage 102 of the heat exchanger 1 from the cooling water tank of the engine. It should be noted here that, the cooling water does not simply refer to water, which may also other liquid solutions.

The cooling oil in the gearbox 8 directly passes through the first communicating hole 32 of the mounting plate 3 and flows into the first flow passage 101 of the heat exchanger 1. In the heat exchanger 1, the cooling oil first exchanges heat with the cooling water in the second flow passage 102 and thus the temperature of the cooling oil rises. Then the cooling oil passes through the connecting block 4 and flows into the thermostatic valve component 2 from the first inlet passage 211.

In the case that the temperature of the cooling oil is not higher than the second set temperature of the thermo-sensitive element in the thermally-actuated element, that is, the cooling oil does not need to be cooled, the cooling oil flows out of the thermostatic valve component 2 from the first outlet passage 212, and passes through the second connecting channel 42 of the connecting block 4, the fifth passage 205 of the heat exchanger 1 and the second communicating hole 33 of the mounting plate 3 in a list sequence to flow back to the gearbox.

As the gearbox operates, the temperature of the cooling oil will be increased gradually. In the case that the temperature of the cooling oil is overly high and higher than the first set temperature of the thermo-sensitive element in the thermally-actuated element, that is, the cooling oil needs to be cooled, a flow channel via which the cooling oil flows to the first outlet passage 212 is cut off by the thermally-actuated element actuated by the expanding of the thermo-sensitive element for being subjected to heat. The cooling oil flows out of the thermostatic valve component 2 from the second outlet passage 213 and then flows to the second heat exchanger 9. The cooling oil is cooled in the second heat exchanger 9 to an appropriate temperature, and then flows into the thermostatic valve component 2 via the second inlet passage 214. After that, the cooling oil flows out of the thermostatic valve component 2 from the first outlet passage 212, and passes through the second connecting channel 42 of the connecting block 4, the fifth passage 205 of the heat exchanger 1, and the second communicating hole 33 of the mounting plate in a list sequence and flows back to the gearbox.

The heat exchanger 1 in the heat exchange device has functions of heating the cooling oil and cooling the cooling oil. The cooling oil may be cooled by heat dissipation in the heat exchanger 1, and may also be heated when being at a low temperature and subjected to heat. When an vehicle is just started, the temperature of the cooling oil is low, and is lower than a normal operation temperature of the cooling oil, the cooling oil needs to be heated. In a short time after the vehicle starts, the temperature of the cooling water in the cooling water tank of the engine rises quickly, and the temperature of the cooling oil rises relatively slow, at this time, the temperature of the cooling oil is lower than the temperature of the cooling water. In the heat exchanger 1, the cooling oil and the cooling water exchange heat with each other, and the cooling oil is heated, which may rise the temperature of the cooling oil to a normal working temperature quickly.

As the vehicle travels, the temperature of the oil of the gearbox rises, and the cooling oil needs to be cooled, at this time, the temperature of the cooling oil is higher than the temperature of the cooling water. In the heat exchanger 1, the cooling oil and the cooling water exchange heat with each other, and the cooling oil is cooled and the temperature of the cooling oil is lowered, which may allow the temperature of the cooling oil to be maintained at the normal working temperature.

As the vehicle further travels, the temperature of the cooling oil of the gearbox is still higher than the normal working temperature even after being cooled by the cooling water, at this time, the cooling oil passes through the second outlet passage to be cooled again in the second heat exchanger 9, and then flows out from an outlet of the second heat exchanger, and passes through the second inlet passage 214 and the fifth passage 205 in a list sequence and then flows back to the gearbox.

FIGS. 12 to 15 show another embodiment of the present application, as illustrated in the Drawings, in this embodiment, the structure of the fifth port region of the first plate 13 in the heat exchanger 1 has a different structure. The fifth port region 135 of the first plate 13 is provided with a circular step structure protruding from or depressed into the first plate plane 130 by a certain distance, and a through hole for the fluid flowing through is provided in the circular step structure. Further, the fifth port region 135 also protrudes from or is depressed into the first plate plane 130 by a certain distance as the first port region 131 and the second port region 132 do, and the distance by which the fifth port region 135 protrudes from or is depressed into the first plate plane 130 is the same with the distance by which the first port region 131 and the second port region 132 protrude from or are depressed into the first plate plane 130. Apparently, the fifth port region 135 may also protrude from or be depressed into the first plate plane 130 by a certain distance as the third port region 133 and the fourth port region 134 do, which depends on requirements.

Correspondingly, the fifth port region of the second plate 14, the fourth port region of the bottom plate 11 and the second port region of the end plate 12 corresponding to the fifth port region of the first plate 13 are also each of a circular step structure provided with a through hole in the middle, and the arrangement of the fifth port region of the first plate and the fifth port region of the second plate protruding from or depressed into their respective plate planes are same with the arrangement of the first port region of the first plate and the first port region of the second plate protruding from or depressed into their respective plate planes. The fifth port region 135 of the first plate 13, the fifth port region of the second plate 14, and the fourth port region of the bottom plate 11, and the second port region of the end plate 12 are stacked to form an accommodating hole 100 running through the heat exchanger 1. The accommodating hole 100 may be in communication with the first flow passage 101 or the second flow passage 102.

Figure 12:
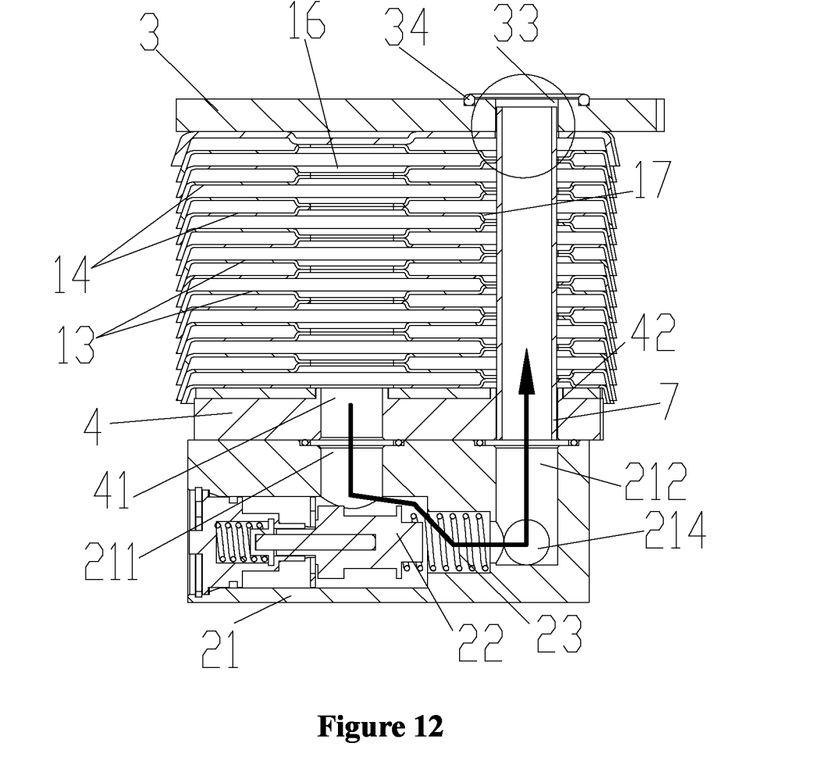
FIG. 12 is a schematic sectional view of a heat exchange device according to another embodiment of the present application.
Figure 13:
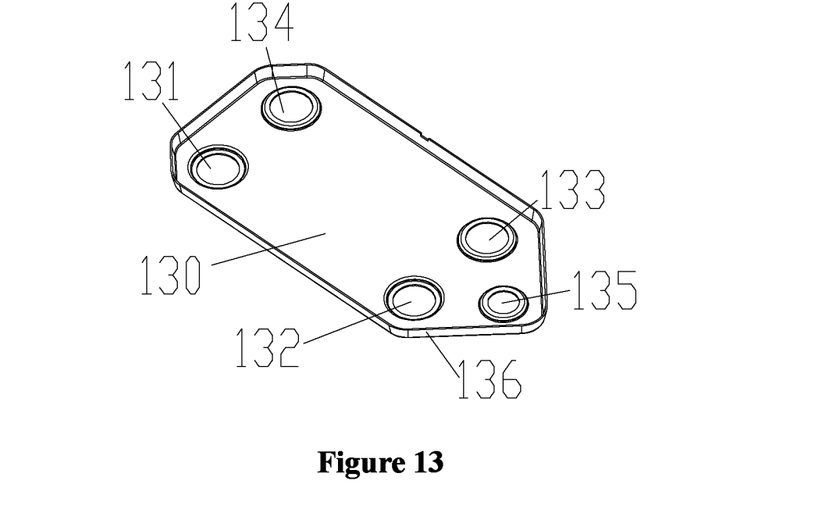
FIG. 13 is a schematic view showing the structure of a first plate of the heat exchange device in FIG. 12.
Figure 14:
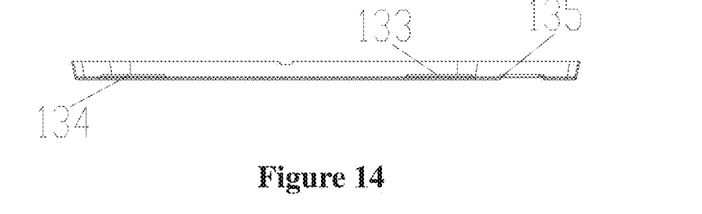
FIG. 14 is a schematic sectional view of the first plate in FIG. 13.
Figure 15:
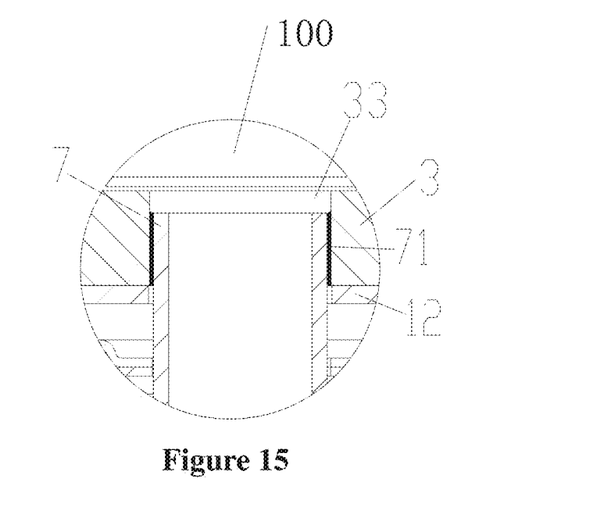
FIG. 15 is a schematic partially enlarged view of FIG. 12.

A connecting pipe 7 is further provided in the accommodating hole 100, and the connecting pipe 7 is provided therein with a connecting passage. The connecting pipe 7 has one end located in the second communicating hole 33 of the mounting plate 3, and the other end located in the second connecting channel 42 of the connecting block 4. As illustrated in the Drawings, the one end of the connecting pipe 7 located in the second communicating hole 33 of the mounting plate 3 may be fixedly mounted to the second communicating hole 33 by expanding, riveting, etc., and then the connecting pipe 7 and an inner wall of the second communicating hole 33 are fixedly mounted in a sealed manner by welding or other ways, and then the connecting pipe 7 and the mounting plate 3 are fixed by the welding at the second communicating hole 33. A welding layer 71 is formed between the connecting pipe 7 and the second communicating hole 33. Apparently, the connecting pipe 7 and the inner wall of the second communicating hole 33 may also be fixedly mounted in a sealed manner directly by welding or other ways.

The connecting pipe 7 and an inner wall of the second connecting channel 42 of the connecting block 4 may employ clearance fit. The other end of the connecting pipe 7 located in the second connecting channel 42 of the connecting block 4 may also be fixedly mounted to the second connecting channel 42 by expanding, riveting, etc., and then the connecting pipe 7 and an inner wall of the second connecting channel 42 may be fixedly mounted in a sealed manner by welding or other ways. Apparently, the connecting pipe 7 and the inner wall of the second connecting channel 42 may also be fixedly mounted directly by welding or other ways.

In the case that the fifth port region 135 also protrudes from or is depressed into the first plate plane 130 by a certain distance as the first port region 131 and the second port region 132 do, that is, when the accommodating hole 100 is in communication with the first flow passage 101, the connecting pipe 7 and the inner wall of the second connecting channel 42 of the connecting block 4 may not be fixedly mounted in the sealed manner. The accommodating hole 100 may be in communication with the first flow passage 101, but not in communication with the second flow passage 102. The connecting pipe 7 and the inner wall of the second connecting channel 42 may employ clearance fit, and the clearance between the connecting pipe 7 and the inner wall of the second connecting channel 42 is small, thus it is not easy for the cooling oil to flow into the accommodating hole 100 via the clearance between the connecting pipe 7 and the inner wall of the second connecting channel 42, and even if a small amount of cooling oil flows back into the fifth passage 205, the usage will not be adversely affected, that is to say, a certain degree of internal leakage is permitted.

Other structures and working principles of this embodiment are similar or approximate to those of the above embodiments, which are not described here any more.

The above-described are only specific embodiments of the present application, which are not intended to limit the present application in any forms. Although the present application is disclosed with preferable embodiments as above, these embodiments are not intended to limit the present application. Many variations and modifications may be made to the technical solution of the present application, or equivalent embodiments may be modified from the technical solution of the present application by those skilled in the art based on the methods and the technical contents disclosed above without departing from the scope of the present application. Therefore, all contents that do not depart from the technical solution of the present application, and any simple alteration, equivalent variation and modification made to the embodiments based on the technical substance of the present application should all fall in the scope of protection of the present application.

The invention claimed is:

1. A heat exchange device, comprising:
a heat exchanger,
a mounting plate, and
a connecting block,
wherein the mounting plate and the connecting block are located at two sides, opposite to each other, of the heat exchanger, the heat exchanger comprises a plurality of first plates, a plurality of second plates, and an end plate and a bottom plate located at the two sides of the heat exchanger,
wherein each of the first plates and an adjacent second plate form a first flow passage and a second flow passage, the first flow passage and the second flow passage are not communicated, the heat exchanger comprises a heat exchange core, the heat exchange core comprises the bottom plate, the end plate, the first plates and the second plates which are fixedly mounted, the mounting plate and the end plate are fixedly mounted, the connecting block and the bottom plate are fixedly mounted, the mounting plate comprises at least one communicating hole, the connecting block comprises a first connecting channel and a second connecting channel, and the first connecting channel is in communication with the first flow passage, and
the heat exchange device further comprises a connecting passage running through the heat exchanger, the connecting passage is in communication with the communicating hole and the second connecting channel, and the connecting passage is not in communication with the second flow passage.

2. The heat exchange device according to claim 1, wherein the first plate comprises a hole flanging which protrudes from or is depressed into a plate plane of the first plate by a certain distance, the second plate also comprises a hole flanging which protrudes from or is depressed into a plate plane of the second plate by a certain distance, the end plate also comprises a hole flanging which protrudes from or is depressed into a plate plane of the end plate by a certain distance, the bottom plate comprises a hole corresponding to the hole flanging of the first plate or the hole flanging of the second plate, and, the hole flanging of the first plate, the hole flanging of the second plate, the hole flanging of the end plate and the hole of the bottom plate are stacked to form the connecting passage or a part of the connecting passage, the connecting passage is not in communication with the first flow passage and the second flow passage.

3. The heat exchange device according to claim 2, wherein the hole of the bottom plate is a hole flanging which protrudes from or is depressed into a plate plane of the bottom plate by a certain distance;
the heat exchange core comprises a first passage, a second passage, a third passage, a fourth passage and a fifth passage, the first passage is in communication with the second passage via the first flow passage, the third passage is in communication with the fourth passage via the second flow passage, and the fifth passage is the connecting passage; and
the fifth passage is located outside a region enclosed by the first passage, the second passage, the third passage and the fourth passage.

4. The heat exchange device according to claim 2, wherein the hole of the bottom plate is a hole flanging which protrudes from or is depressed into a plate plane of the bottom plate by a certain distance;
the heat exchange core comprises a first passage, a second passage, a third passage, a fourth passage and a fifth passage, the first passage is in communication with the second passage via the first flow passage, the third passage is in communication with the fourth passage via the second flow passage, and the fifth passage is the connecting passage; and
the fifth passage is located inside a region enclosed by the first passage, the second passage, the third passage and the fourth passage.

5. The heat exchange device according to claim 3, wherein the mounting plate comprises a first communicating hole, a second communicating hole and a plurality of mounting holes located at an outer side, the first communicating hole is in communication with the first passage, and the second communicating hole is in communication with the fifth passage; and
in an axis direction of the mounting holes, the mounting holes are located outside the heat exchanger.

6. The heat exchange device according to claim 3, wherein the mounting plate is fixedly mounted to the end plate by welding, at least a portion of one surface of the mounting plate is in contact with the end plate, and on another surface of the mounting plate, an outer circumferential side of an end of the first communicating hole is provided with a first annular groove, and an outer circumferential side of an end of the second communicating hole is provided with a second annular groove.

7. The heat exchange device according to claim 6, wherein the first connecting channel is in communication with the second passage, and the second connecting channel is in communication with the fifth passage; and
the first communicating hole is in communication with the first connecting channel via the first passage, the first flow passage and the second passage, and, the second communicating hole is in communication with the second connecting channel via the fifth passage.

8. The heat exchange device according to claim 7, wherein a first outward extending portion is formed at one end of the first connecting channel by protruding from an end surface of the connecting block, and a second outward extending portion is formed at one end of the second connecting channel by protruding from the end surface of the connecting block, the connecting block is fixedly mounted to the bottom plate by welding, and at least part of the first outward extending portion extends respectively into the second passage, and at least part of the second outward extending portion extend respectively into the fifth passage.

9. The heat exchange device according to claim 1, wherein the heat exchange core forms a first passage, a second passage, a third passage, and a fourth passage and an accommodating hole running through the heat exchange core, and the first passage and the second passage are in communication with each other via the first flow passage, and the third passage and the fourth passage are in communication with each other via the second flow passage;
the communicating hole is arranged to be corresponding to the accommodating hole, and the second connecting channel is arranged to be corresponding to the accommodating hole; and
a connecting pipe is further provided in the accommodating hole, the connecting passage is provided in the connecting pipe, one end of the connecting pipe is fixedly mounted to the communicating hole in a sealed manner, and at least a part of another end of the connecting pipe is located in the second connecting channel, an outer wall of the connecting pipe and an inner wall of the second connecting channel are in clearance fit or are fixed to each other in a sealed manner.

10. The heat exchange device according to claim 9, wherein the first plate comprises a plate plane and a flanging located on an outer circumferential side of the plate plane, the plate plane comprises a first plate plane substantially in a rectangular shape and a second plate plane adjacent to the first plate plane, the first plate plane comprises a first port region, a second port region, a third port region and a fourth port region, the second plate plane is provided with a fifth port region, the first port region, the second port region, and the fifth port region are each a circular step structure protruding from or depressed into the plate plane by a certain distance, and the first port region, the second port region, and the fifth port region protrude from or are depressed into the plate plane by a same distance;
the second plate also comprises one port region, and the port region corresponds to the fifth port region of the first plate, the port region is a circular step structure protruding from or depressed into the plate plane of the second plate by a certain distance; and
the fifth port region of each of the first plates and the fifth port region of each of the second plates are in communication with each other, the accommodating hole comprises the fifth port region of each of the first plates and the fifth port region of each of the second plates, and the accommodating hole is located outside a region enclosed by the first passage, the second passage, the third passage and the fourth passage.

11. The heat exchange device according to claim 10, wherein the accommodating hole is in communication with the first flow passage, the mounting plate comprises a first communicating hole, a second communicating hole, and a plurality of mounting holes located at an outer side, the first communicating hole is in communication with the first passage, the second communicating hole is in communication with the connecting passage of the connecting pipe; in an axis direction of the mounting holes, the mounting holes are completely exposed outside the heat exchanger.

12. The heat exchange device according to claim 11, wherein one surface of the mounting plate is fixedly mounted to the end plate by welding, on another surface of the mounting plate, an outer circumferential side of an end of the first communicating hole is provided with a first annular groove, and an outer circumferential side of an end of the second communicating hole is provided with a second annular groove, and a sealing ring is provided in each of the first annular groove and the second annular groove.

13. The heat exchange device according to claim 12, wherein the first connecting channel is in communication with the second passage, and the second connecting channel is in communication with the connecting passage of the connecting pipe; and
the first communicating hole is in communication with the first connecting channel via the first passage, the first flow passage and the second passage, the second communicating hole is in communication with the second connecting channel via the connecting passage of the connecting pipe.

14. The heat exchange device according to claim 13, wherein a first outward extending portion is formed at one end of the first connecting channel by protruding from an end surface of the connecting block, and a second outward extending portion is formed the second connecting channel at one end of the second connecting channel by protruding from the end surface of the connecting block, the connecting block is fixedly mounted to the bottom plate by welding, and the first outward extending portion and the second outward extending portion extend respectively into the second passage and the fifth passage, one end of the connecting pipe is fixed to the second communicating hole by welding, and another end of the connecting pipe is fixed to the second connecting channel by welding.

15. The heat exchange device according to claim 1, wherein the heat exchanger further comprises a thermostatic valve component, the thermostatic valve component comprises a valve body, a thermally-actuated element and a return spring, the valve body comprises a cavity with one end open, a first inlet passage, a first outlet passage and a second outlet passage, and the thermally-actuated element and the return spring are mounted in the cavity, the thermosensitive element is supported on the return spring;
under the action of the thermally-actuated element and the return spring, the first inlet passage is selectively in communication with the first outlet passage and/or the second outlet passage; and
the thermostatic valve component is fixedly mounted to the connecting block, the first inlet passage is in communication with the first connecting channel, and the first outlet passage is in communication with the second connecting channel.

16. The heat exchange device according to claim 15, wherein the thermostatic valve component of the heat exchanger further comprises a second inlet passage, and the second inlet passage is in communication with the first outlet passage, the second inlet passage and the second outlet passage are located in a same side wall of the valve body, an outer circumferential side of the first inlet passage on a side, in contact with the connecting block, of the valve body is provided with a third annular groove, and a sealing ring is provided in the third annular groove; and
an outer circumferential side of the second outlet passage on the side, in contact with the connecting block, of the valve body is provided with a fourth annular groove, and a sealing ring is also arranged in the fourth annular groove.

17. The heat exchange device according to claim 16, wherein the first inlet passage is substantially in parallel with the first outlet passage; and the second passage, the first connecting channel and the first inlet passage substantially have a same center line, and also the connecting passage, the second connecting channel and the first outlet passage substantially have a same center line.

18. A cooling system for cooling oil of a gearbox, comprising a gearbox, a heat exchange device, which comprises:
a first heat exchanger,
a mounting plate, and
a connecting block,
wherein the mounting plate and the connecting block are located at two sides, opposite to each other, of the first heat exchanger, the first heat exchanger comprises a plurality of first plates, a plurality of second plates, and an end plate and a bottom plate located at the two sides of the first heat exchanger, wherein each of the first plates and an adjacent second plate form a first flow passage and a second flow passage, the first flow passage and the second flow passage are not communicated, the first heat exchanger comprises a heat exchange core, the heat exchange core comprises the bottom plate, the end plate, the first plates and the second plates which are fixedly mounted, the mounting plate and the end plate are fixedly mounted, the connecting block and the bottom plate are fixedly mounted, the mounting plate comprises at least one communicating hole, the connecting block comprises a first connecting channel and a second connecting channel, and the first connecting channel is in communication with the first flow passage, and the heat exchange device further comprises a connecting passage running through the first heat exchanger, the connecting passage is in communication with the communicating hole and the second connecting channel, and the connecting passage is not in communication with the second flow passage, a second heat exchanger, and a third heat exchanger, wherein the heat exchange device further comprises a thermostatic valve component, the thermostatic valve component comprises a first inlet passage, a first outlet passage and a second outlet passage, and, the gearbox is fixedly mounted to the mounting plate by a screw, an outlet port of the gearbox is in communication with the first flow passage of the first heat exchanger, an inlet port of the gearbox is in communication with the connecting passage via the communicating hole, the first outlet passage of the thermostatic valve component is in communication with the connecting passage via the second connecting channel, and the first inlet passage of the thermostatic valve component is in communication with the first flow passage via the first connecting channel, the second outlet passage of the thermostatic valve component is in communication with an inlet of the second heat exchanger, and an outlet of the second heat exchanger is in communication with an inlet of the gearbox.

19. A cooling system for cooling oil of a gearbox, comprising:

a gearbox, a heat exchange device, which comprises
a first heat exchanger,
a mounting plate, and
a connecting block,
wherein the mounting plate and the connecting block are located at two sides, opposite to each other, of the first heat exchanger, the first heat exchanger comprises a plurality of first plates, a plurality of second plates, and an end plate and a bottom plate located at the two sides of the first heat exchanger, wherein each of the first plates and an adjacent second plate form a first flow passage and a second flow passage, the first flow passage and the second flow passage are not communicated, the first heat exchanger comprises a heat exchange core, the heat exchange core comprises the bottom plate, the end plate, the first plates and the second plates which are fixedly mounted, the mounting plate and the end plate are fixedly mounted, the connecting block and the bottom plate are fixedly mounted, the mounting plate comprises at least one communicating hole, the connecting block comprises a first connecting channel and a second connecting channel, and the first connecting channel is in communication with the first flow passage, and the heat exchange device further comprises a connecting passage running through the first heat exchanger, the connecting passage is in communication with the communicating hole and the second connecting channel, and the connecting passage is not in communication with the second flow passage, a second heat exchanger, and a third heat exchanger, wherein, the heat exchange device further comprises a thermostatic valve component, the thermostatic valve component comprises a first inlet passage, a first outlet passage, a second outlet passage and a second inlet passage, the second inlet passage is in communication with the first outlet passage, the gearbox is fixedly mounted to the mounting plate by a screw, an outlet port of the gearbox is in communication with the first flow passage of the first heat exchanger, an inlet port of the gearbox is in communication with the connecting passage via the communicating hole, the first outlet passage of the thermostatic valve component is in communication with the connecting passage via the second connecting channel, and the first inlet passage of the thermostatic valve component is in communication with the first flow passage via the first connecting channel, the second outlet passage of the thermostatic valve component is in communication with an inlet of the second heat exchanger, and the second inlet passage of the thermostatic valve component is in communication with an outlet of the second heat exchanger, and the outlet of the second heat exchanger is in communication with an inlet of the gearbox via the second inlet passage, the first outlet passage, the second connecting channel, the connecting passage and the communicating hole.

\* \* \* \* \*

UNITED STATES PATENT AND TRADEMARK OFFICE
CERTIFICATE OF CORRECTION

PATENT NO. : 10,473,209 B2
APPLICATION NO. : 15/220995
DATED : November 12, 2019
INVENTOR(S) : Jiang Zou et al.

Page 1 of 1

It is certified that error appears in the above-identified patent and that said Letters Patent is hereby corrected as shown below:

On the Title Page

In item (72), Inventor:
Please replace "Weixin Jiang, Zheijiang (CN)" with --Weixin Jiang, Zhejiang (CN)--

Signed and Sealed this
Fourth Day of February, 2020

Andrei Iancu
*Director of the United States Patent and Trademark Office*